United States Patent [19]

Yamaguchi et al.

[11] Patent Number: 5,064,714
[45] Date of Patent: Nov. 12, 1991

[54] INTERNAL TRIM MEMBER FOR AUTOMOBILE

[75] Inventors: Michiyuki Yamaguchi, Fuchu; Shosuke Suzuki; Takeo Yokobori, both of Kamakura, all of Japan

[73] Assignee: Bridgestone Corporation, Tokyo, Japan

[21] Appl. No.: 416,558

[22] Filed: Oct. 3, 1989

[30] Foreign Application Priority Data

Oct. 3, 1988 [JP] Japan .................................. 63-249638

[51] Int. Cl.⁵ ........................ B32B 27/00; B29C 47/00
[52] U.S. Cl. .................................... 428/219; 428/171;
428/172; 428/224; 428/284; 428/286; 428/289;
428/290; 428/293; 428/297; 428/317.9;
428/318.4; 428/319.3; 428/319.9; 428/323;
428/332; 428/339; 428/340; 428/359; 428/364;
428/394; 156/245; 264/257
[58] Field of Search ................. 428/95, 219, 292, 284,
428/286, 224, 318.4, 172, 96, 92, 97, 289, 290,
293, 297, 303, 317.9, 319.3, 323, 332, 339, 340,
359, 401, 364, 394, 156, 161, 171; 156/245;
264/45.1, 243, 257

[56] References Cited

U.S. PATENT DOCUMENTS 2,543,101  7/1944  Francis ............................... 428/239
4,035,215  7/1977  Goldstone .......................... 156/245
4,420,526 12/1983  Schilling et al. .................... 428/171
4,581,272  4/1986  Walters et al. ...................... 428/172
4,781,956 11/1988  Zimmermann et al. ............. 428/172

FOREIGN PATENT DOCUMENTS 8715142 11/1987  Fed. Rep. of Germany .
60-51432 11/1985  Japan .
2005191  4/1979  United Kingdom .

Primary Examiner—Ellis P. Robinson
Assistant Examiner—Donald J. Loney
Attorney, Agent, or Firm—Sughrue, Mion, Zinn, Macpeak & Seas

[57] ABSTRACT

An internal trim member for use in a dash panel and/or floor panel in passenger cars comprises a fiber assembly made from staples matched with the shape of the vehicle body panel, and a sheet-like sound insulating layer laminated thereon.

5 Claims, 2 Drawing Sheets

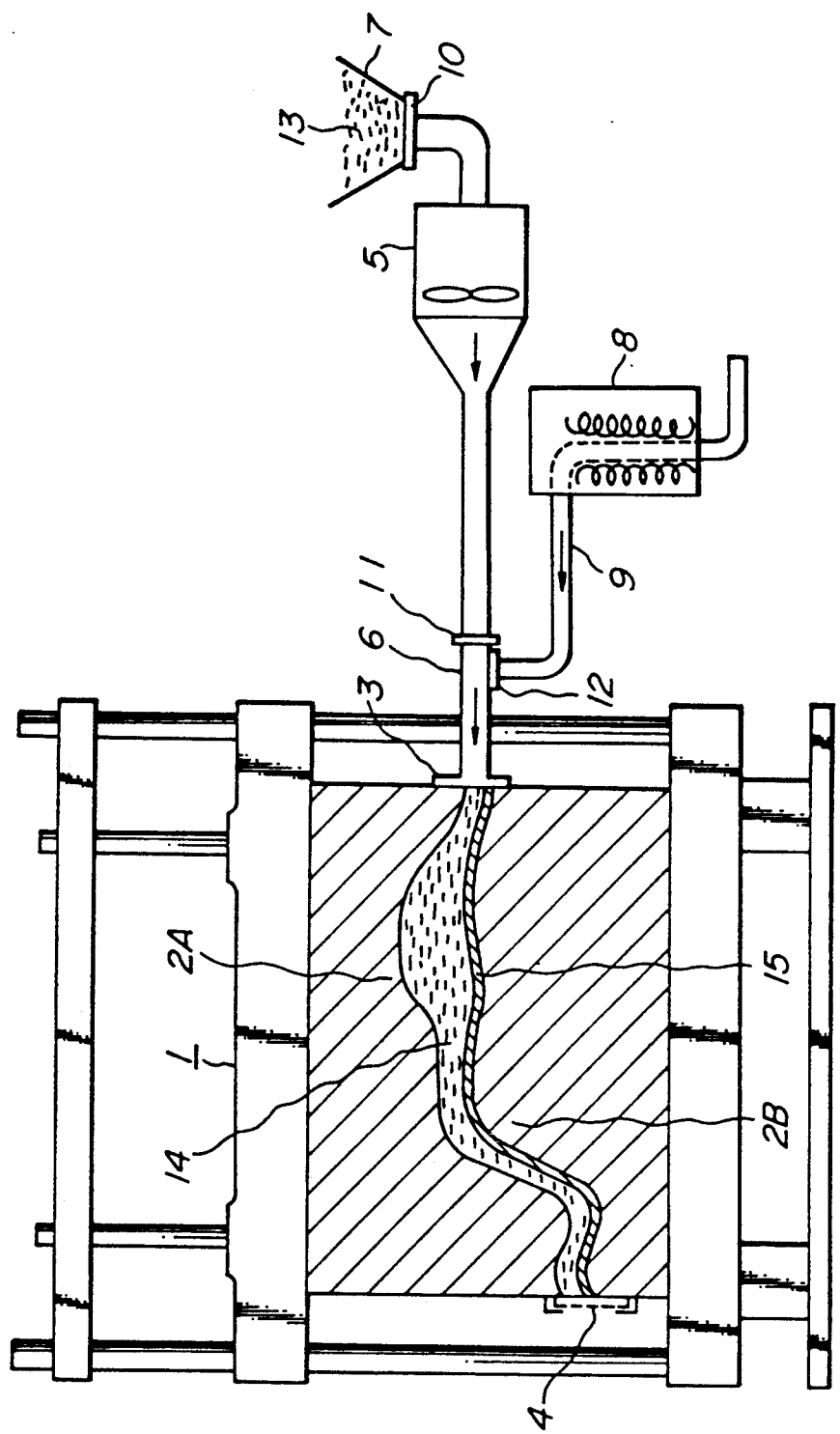

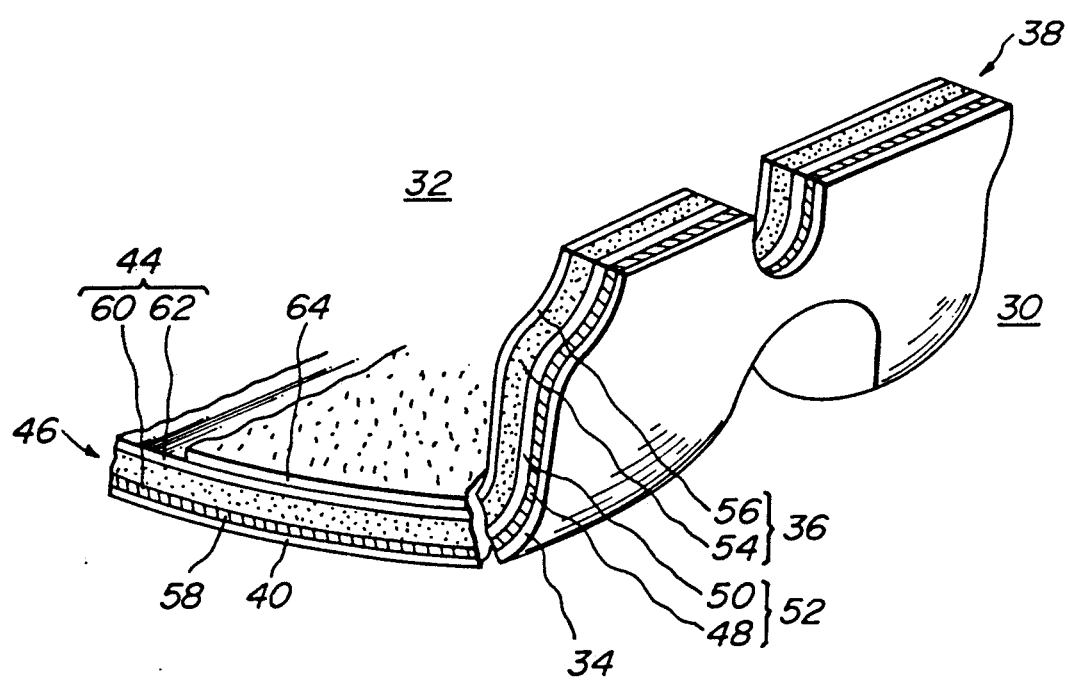
FIG_2

INTERNAL TRIM MEMBER FOR AUTOMOBILE

BACKGROUND OF THE INVENTION

1. Field of the Invention

This invention relates to an internal trim member for sound insulation in an inside of an automobile. More particularly it relates to an internal trim member for automobile useful as a sound proof material disposed on a partition wall between an engine room and a cabin or between a floor panel and a carpet.

2. Related Art Statement

In order to reduce the noise level inside the car, it has been particularly attempted to apply a sound proof material called an insulator onto a partition wall (dash panel) between an engine room and a cabin, between a floor panel and a carpet and the like among panels constituting a vehicle body.

FIG. 2 shows an example of a structure of an internal trim member suitable as an insulator disposed on the dash panel (dash insulator) or an insulator disposed on the floor panel (floor insulator).

In FIG. 2, a dash panel structure 38 inclusive of a dash insulator 36 is formed on a partition wall (dash panel) 34 between an engine room 30 and a cabin (chamber) 32, while a floor structure 46 inclusive of a floor insulator 44 is formed between a floor panel 40 and a carpet 64.

The dash panel structure 38 is formed by joining a constrained damping member 52 comprised of a laminate of an asphalt series damping material 48 and a constraining plate 50 onto an inner face of the dash panel 34 made from a steel plate and then joining the dash insulator 36 comprised of a laminate of a porous layer 54 and a sheet-like sound insulating layer 56 thereonto.

On the other hand, the floor structure 46 is formed by joining an asphalt series damping material 58 onto an inner face of the floor panel 40 made from a steel plate and then joining the floor insulator 44 comprised of a laminate of a porous layer 60 and a sheet-like sound insulating material 62 thereonto. A carpet 64 is arranged inside the floor structure 46.

The porous layers 54 and 60 acting as a sound proof layer are made from a felt using a powdery thermosetting resin as a binder, or a foamed body such as flexible urethane foam or the like. The sheet-like sound insulating layers 56 and 62 laminated on the porous layers 54 and 60 are made, for example, from a flexible polyvinyl chloride or an ethylene-vinyl acetate copolymer.

In the conventional dash insulator 36 or floor insulator 44, however, since the porous layers 54 and 60 are made from a flat plate-like material, they can not sufficiently be adhered to the surface of the body panel shaped into a complicated uneven form for increasing the strength or the like such as dash panel 34, floor panel 40 or the like, so that a space is formed and consequently the sound proof performances are frequently insufficient.

Furthermore, since the porous layer is not closely adhered to the body panel, the appearance inside the car is damaged. Moreover, the size accuracy is poor, so that there is caused an inconvenience in the attachment of other parts.

Recently, it has been proposed to use a urethane foamed body molded so as to match with the uneven form of the body panel, a compression shaped body of felt having a density of not less than 0.04 g/cm³ or the like instead of the flat plate-like porous layer as an internal trim member for automobile.

In such a urethane foamed body, however, a skin layer is formed in the surface or the cell membranes remain in the internal fine pore structure, so that air inside the foamed body is hardly moved to make the porous layer hard. Consequently, the sound insulating effect is insufficient.

In the felt compression shaped body, the felt is not less than 0.04 g/cm³, so that the body is locally hardened due to the presence of highly compressed portion, whereby the sound insulating performances are degraded and also the weight of the body as a whole becomes heave which conflict with the general goal of weight reduction of the automobile.

SUMMARY OF THE INVENTION

In light of the above conventional techniques, it is an object of the invention to provide a dash insulator or a floor insulator having a higher sound proof performance for realizing a silent space inside the automobile. That is, the object of the invention is to provide an internal trim member for an automobile having a given density for sound absorptivity, an easiness of forming a shape closely adhered to the uneven form f the vehicle body panel, a high size accuracy and excellent sound insulating performances.

According to a first aspect of the invention, there is the provision of an internal trim member for an automobile comprising a fiber assembly made from staples having a fiber size distribution center of not more than 30 denier and shaped at an average apparent density of 0.04–0.15 g/cm³ in accordance with a shape of a vehicle body panel in the automobile, and a sheet-like sound insulating layer laminated thereon and having a surface weight of 1.0–8.0 g/cm².

In a preferred embodiment of the invention, the fiber assembly is formed by a filling method wherein the staples are blown in a mold together with air, whereby the density of the resulting porous layer is made stable and uniform.

In another preferred embodiment of the invention, the staples are mixed with a fiber-like binder for shaping and solidifying the fiber assembly, whereby the uniformity of the density of the porous layer is further enhanced.

In the other preferred embodiment of the invention, the shaping and solidifying of the fiber assembly is made by blowing hot air or steam into the mold, whereby the uniformity of the density distribution and the shaping cycle in the sound absorptive porous layer are improved and the curling is made uniform.

In the still further preferred embodiment of the invention, the fiber assembly is shaped and solidified by mixing the staples with not less than 10% by weight of fiber-like asphalt and blowing hot air or steam thereinto, whereby damping performances are given to the sound absorptive porus layer to further improve the acoustic performance.

According to a second aspect of the invention, there is the provision of an internal trim member for an automobile comprising a fiber assembly obtained by preliminary shaping staples having a fiber size distribution center of not more than 30 denier with a binder into a flat plate-like fiber assembly having an apparent density of not more than 0.025 g/cm³ and compression shaping at a compression ratio of 2–4 in accordance with a shape of a vehicle body panel in the automobile, and a sheet-like sound insulating layer laminated thereon and having a surface weight of 1.0–8 kg/m², whereby the internal trim member having a given density for sound absorptivity, an easiness of forming a shape closely adhered to the uneven form of the vehicle body panel, a high size accuracy and excellent sound insulating performances is obtained. That is, the invention has characteristics as mentioned below:

(i) The porous layer for the internal trim member according to the invention is formed in accordance with the shape of the vehicle body panel as compared with the conventional sheet-like porous layer, so that it is excellent in the matching property with the vehicle body panel (dash panel, floor panel or the like) and can be closely adhered to the vehicle body panel without space to improve the sound proof performances.

(ii) The porous layer used in the internal trim member according to the invention is obtained by shaping the fiber assembly as compared with the conventional porous layer made from a urethane shaped body and comprises a staple-like laminate as a whole, so that the resonance is less and the average sound absorptivity is excellent, whereby the total sound proofness can be improved.

(iii) In the porous layer according to the invention, the density distribution is small and uniform as a whole as compared with the conventional flat plate-like fiber assembly (e.g. density: about 0.04 g/cm³), so that the excessively compressed portion is not formed at the fitting position, and consequently the total sound proofness can be improved by the averagedly soft porous layer having a less resonance.

BRIEF DESCRIPTION OF THE DRAWINGS

The invention will be described with reference to the accompanying drawings, wherein:

FIG. 1 is a schematically longitudinal section view of an apparatus for forming a porous layer in the internal trim member for an automobile according to the invention; and FIG. 2 is a perspective view partly showing in section of a sound proof structure for dash panel and floor panel in the automobile.

DESCRIPTION OF THE PREFERRED EMBODIMENTS

In the first embodiment of this invention, the fine staples having a fiber size distribution center of not more than 30 denier are used at an apparent density of a given range to make the permeation resistance inside the fiber assembly large, whereby the sound absorption characteristics are improved. When the fibers having a fiber size distribution center of more than 30 denier are used, if the apparent density is the same, the fiber assembly becomes a rough state and the permeation resistance is not raised and consequently the sound absorptivity is poor. Therefore, if it is intended to improve the sound absorptivity only by increasing the apparent density, the fiber assembly becomes too hard, and consequently vibrations from the panel are transmitted to the sheet-like sound insulating layer to radiate sound. This results in the degradation of sound proof performances.

Moreover, the increase of the apparent density results in the increase of the vehicle weight, which is opposite to the goal of weight reduction.

From these points, in order to achieve the object of the invention, it is necessary to set the upper limit of the apparent density to 0.15 g/cm³.

On the other hand, even when using the staple having a fiber size distribution center of not more than 30 denier, if the apparent density is less than 0.04 g/cm³, the permeation resistance is not increased, and consequently sound absorptivity can not be expected and the sound proof performances are insufficient.

As the staple used in the internal trim member according to the invention, it is desirable to use staples having a fiber size distribution center of not more than 30 denier, preferably not more than 15 denier for realizing a higher sound absorptivity.

As a material of the staple, use may be made of synthetic fibers such as polyester, polypropylene, polyethylene, nylon, vinylon and the like; and natural fibers such as wool, cotton, hemp and the like.

Moreover, the staples may be obtained by fibrillating a cloth made from the aforementioned fibers.

In this case, asphalt or its analogous material is spun by a melt spinning or other method and incorporated into the aforementioned staples in an amount of not less than 10% by weight or used alone to obtain a shaped body of the fiber assembly, whereby a large sound insulating and absorptive effect is obtained.

As the analogous material of asphalt, there is used an asphalt containing not less than 30% by weight of a modified asphalt in which the brittleness and temperature dependency of the asphalt are modified with a resin, rubber, thermoplastic elastomer or the like.

The reason why the large sound insulating and absorptive effect is obtained by using fibers made from asphalt or its analogous material is due to the fact that the sound deadening property (high damping property) of the asphalt is given to the fiber assembly to provide not only the sound insulating and absorptive property but also the function of controlling vibrations of the panel.

In the second embodiment of this invention, the fiber assembly is obtained by placing a preliminary shaped flat platelike fiber assembly containing a binder and having an apparent density of not more than 0.025 g/cm³ in a mold and then compression shaping it under heating to a volume of $\frac{1}{2}$–$\frac{1}{4}$.

As the preliminary shaped body, there may be used a fiber assembly obtained by binding polyester fibers with a binder such as polyethylene fiber, low melting point polyester fiber, asphalt fiber or the like. When the preliminary shaped body is compression shaped into the desired fiber assembly, if the compression ratio is less than 2, the permeation becomes too large and the sound absorptivity is low. If the compression ratio exceeds 4, the density distribution becomes large and the excessively compressed portion is caused to provide the insufficient sound proof performances.

The internal trim members for automobiles according to the invention may be obtained by various shaping methods as mentioned above. In order to conduct the more uniform filling for making the density distribution small, it is preferable to adopt a method wherein the fibrillated fibers are blown into a mold together with a gas (air) and filled therein while discharging only air through many fine holes formed in the mold.

By such a filling method of air carrying system, the filling is made possible in a shape along the mold matched with the uneven panel shape, whereby the uniform and soft porous layer as a whole can be obtained.

Moreover, a binder is required for shaping and solidifying the thus obtained porous layer.

As the binder, there are considered various materials such as phenolic resin, which is fused by heating and solidified through reaction, a urethane series adhesive solidified through reaction by blowing steam, a thermoplastic resin fused at a temperature lower than a fusing temperature of the staple as a substrate, and the like.

As the form of the binder, there are powder, liquid and so on. In case of the powder, however, the segregation of the powdery binder is caused in the filling through blowing to bring about the poor dispersion, and also the air-escape holes may be clogged with the binder to cause poor filling or insufficient density distribution, or only the binder may be scattered. On the other hand, in case of the liquid, the agglomeration of the fibers is caused in the mixing, and consequently good filling can not be obtained.

On the contrary, when using the fiber-like binder, good filling is obtained by using a fibrillating machine for mixing, and also there is caused no trouble in filling. As such a fiber-like binder, use may be made of low melting point polyester fiber fused by heating or blowing of steam, polyethylene or polypropylene fiber having a melting point lower than that of the staple as a substrate, and the like. It is desirable to use composite fibers, in which a low-melting fiber component is arranged around a high-melting fiber component, from a viewpoint of durability and acoustic performances. Because, when the shaping is carried out at a temperature higher than the melting point of the low-melting fiber component but lower than the melting point of the high-melting fiber component, the binder fibers can be bonded at a fiber-like state by fusing of the low-melting fiber component to ensure high durability and acoustic performances. Furthermore, any fiber-like binders fused by heating or the like such as asphalt fiber and so on may be used.

As the shaping method of the porous layer containing the fiber-like binder, there are considered hot press, shaping in a heated mold and the like. However, in these methods, a long heating time is required for fusing the binder inside the porous layer because the porous layer has a heat insulating effect, and it is difficult to shorten the shaping cycle.

If it is intended to set the shaping temperature to a high value, the shaping cycle may be shortened. In this case, however, there is a possibility that the shape loss is caused in the step of releasing from the mold when using a binder other than reaction-curing type binder, for example, a thermoplastic binder such as asphalt fiber or polyethylene fiber Therefore, a method wherein the binder is fused by adjusting the mold temperature to not higher than the meting point of the binder and blowing hot air or steam at a temperature of not lower than the above melting point is desirable as the shaping method. In this case, the shaping cycle can be further improved by arranging a means for turning over the supply of hot air and cold air. The blowing of hot air or the like can uniformly fuse and cure the porous layer up to the inside thereof.

As mentioned above, the staples are blown into the mold together with the fiber-like binder and further hot air is blown thereinto to fuse the binder and bond the fibers to each other, whereby the porous shaped body being soft and light and having a shape matched with the shape of the vehicle body panel in the automobile can be obtained.

By using such a porous shaped body can be obtained an internal trim member for automobile having a high size accuracy and excellent sound proof performance.

Further, when the asphalt fiber is mixed with the porous layer, the damping performance to the vehicle body panel is provided as the internal trim member for the automobile.

In FIG. 1 is schematically shown a section of an apparatus for manufacturing the internal trim member for an automobile according to the invention. The manufacture of the internal trim member for an automobile according to the invention will be concretely described with reference to FIG. 1 below.

In this case, the internal trim member for a dash panel in a passenger car having a displacement of 1500 cc is manufactured. For this purpose, a mold having a shape matched with the shape of the dash panel is first manufactured and arranged as shown in FIG. 1.

In FIG. 1, numeral 1 is a press machine, numerals 2A, 2B represent a split mold arranged in the press machine 1, numeral 3 a blowing port for the split mold 2A, 2B, numeral 4 a discharge port provided with a filter for the split mold 2A, 2B, numeral 5 a blower, numeral 6 a duct connecting the blower 5 to the blowing port 3, numeral 7 a hopper, numeral 8 a hot air generator, numeral 9 a blast pipe connected to a course of the duct 6 through the hot air generator 9, numeral 10 a shutter for opening and closing a supply port of the hopper 7 to the duct 6, numeral 11 a shutter for opening and closing the duct 6, and numeral 12 a shutter for opening and closing a connecting port of the blast pipe 9 to the duct 6.

Staples 13 as a starting material are mixed with a fiber-like binder and fed to the hopper 7.

Then, the staples 13 are blown together with air into a shaping space defined by the split mold 2A, 2B from the hopper 7 through the blowing port 3 by means of the blower 5 at such a state that the shutters 10 and 11 are opened and the shutter 12 is closed. The shaping space is rendered into a given shape by setting a stroke of the press machine 1.

During the filling of the staples 13 into the split mold 2A, 2B, only the carried air is discharged through the discharge port 4 to the outside of the split mold 2A, 2B, so that the staples 13 are efficiently filled inside the split mold 2A, 2B.

After the filling of the staples 13, the shutters 10 and 11 are closed and the shutter 12 is opened, and then hot air produced from the hot air generator 8 is blown into the split mold 2A, 2B from the blowing port 3 through the blast pipe 9 and the duct 6.

At the same time, the press machine 1 is actuated to compression press the filled staples 13 into a given shape.

In FIG. 1, numeral 14 is a porous fiber shaped body (fiber assembly) compression pressed in the split mold 2A, 2B, and numeral 15 a sheet-like sound insulating layer (mass layer) previously laid at a given position inside the split mold 2A, 2B (inner surface of the lower mold member 2B in the illustrated embodiment) for laminating the porous fiber shaped body 14.

Moreover, the blowing port of the hot air generator 8 is desirable to be arranged in the vicinity of a central portion of the split mold 2A, 2B in addition to the blowing port 3, if necessary.

The following examples are given in illustration of the invention and are not intended as limitations thereof.

EXAMPLE 1

A flat plate-like body comprised of polyester staples with 6–8 denier through fusing of polyethylene fiber as a binder and having an apparent density of 0.021 g/cm$^3$ and a thickness of 40 mm (preliminary shaped body) was placed in a mold and compression shaped at a shaping temperature of 150° C. to obtain a shaped body (fiber assembly) matched with the shape of the dash panel and having an average apparent density of 0.07 g/cm$^3$.

Onto the shaped body was laminated a sheet-like sound insulating layer of polyvinyl chloride shaped under vacuum and having a thickness of 2 mm and a density of 1.8 g/cm$^3$ in the mold to obtain an internal trim member for automobile.

EXAMPLE 2

Polyester staples of 6–8 denier having an average length of 40 mm were mixed with 20% by weight of low melting point polyester fibers of 4 denier having an average length of 50 mm, which were charged into the hopper 7 shown in FIG. 1. Then, the mixture was filled in the split mold 2A, 2B from the hopper 7 and hot air of 200° C. was blown thereinto to form a porous shaped body having an apparent density of 0.08 g/cm$^3$.

The same polyvinyl chloride sheet as in Example 1 was laminated onto the porous shaped body to obtain an internal trim member for automobile.

EXAMPLE 3

Asphalt staples of 2–10 denier were prepared by stirring asphalt of grade 3 for waterproof working according to JIS K-2207 at 240° C. for 48 hours, heating at 180° C. and extruding through a nozzle of 1 mm in diameter while blowing hot air at 250° C..

These staples were mixed with 20% by weight of polyester staples of 6–8 denier having a length of 40 mm and shaped in the same manner as in Example 2 to obtain a porous shaped body having an average apparent density of 0.10 g/cm$^3$.

Then, the same polyvinyl chloride sheet as in Example 1 was laminated onto this porous shaped body to obtain an internal trim member for automobile.

EXAMPLE 4

A rubbery asphalt was obtained by adding 1% by weight of SBR rubber latex having a solid content of 50% to asphalt obtained by stirring asphalt of grade 3 for waterproof working according to JIS K-2207 at 240° C. for 72 hours.

The rubbery asphalt was heated to 200° C., extruded through a nozzle of 1 mm in diameter while blowing hot air of 300° C. and drawn to obtain staples of 4–12 denier.

These staples were mixed with 20% by weight of polyester staples of 6–8 denier to obtain a porous shaped body having an apparent density of 0.12 g/cm$^3$.

The same polyvinyl chloride sheet as in Example 1 was laminated onto the porous shaped body to obtain an internal trim member for automobile.

Although the above examples show the manufacture of various internal trim members according to the invention for use in a sound proof test as mentioned later, the structure of conventional internal trim members for automobile will be concretely described as Comparative Examples below.

COMPARATIVE EXAMPLE 1

A sheet-like rough felt having an apparent density of 0.055 g/cm$^3$ and a thickness of 40 mm was shaped by using a powdery phenolic resin as a binder. This felt was placed in the split mold 2A, 2B of FIG. 1 and press heated at 220° C. to obtain a shaped body matched with the shape of the dash panel.

Then, a polyvinyl chloride sheet shaped under vacuum so as to match with the above shaped body and having a thickness of 2 mm and a density of 1.8 g/cm$^3$ was laminated onto the shaped body to obtain an internal trim member for an automobile consisting of the porous layer and the sheet-like sound insulating layer (mass layer).

The average apparent density of the porous layer was 0.18 g/cm$^3$.

COMPARATIVE EXAMPLE 2

The sheet-like rough felt was stuck to the same polyvinyl chloride sheet as in Comparative Example 1 in a layer form at a thickness substantially equal to the shaping size to obtain an internal trim member for automobile.

In this case, the sheet-like rough felt having a thickness of 5–58 mm was shaped by using a phenolic resin as a binder.

COMPARATIVE EXAMPLE 3

Polyester staples of 50 denier were mixed with 20% by weight of low melting point polyester fiber as a binder, which were filled in the mold and pressed while blowing hot air of 200° C. to obtain a porous shaped body having an apparent density of 0.08 g/cm$^3$.

The same polyvinyl chloride sheet as in Comparative Example 1 was laminated onto the porous shaped body to obtain an internal trim member for an automobile.

COMPARATIVE EXAMPLE 4

Polyester staples of 6–8 denier were mixed with 20% by weight of low melting point polyester fiber as a binder, which were filled in the mold by reducing the shaping space in the mold and reducing the blowing force of hot air to obtain a porous shaped body having an average density of 0.03 g/cm$^3$.

The same polyvinyl chloride sheet as in Comparative Example 1 was laminated onto the porous shaped body to obtain an internal trim member for automobile.

COMPARATIVE EXAMPLE

Polyester staples of 6–8 denier were mixed with a powdery phenolic resin s a binder and blown into the split mold 2A, 2B in the shaping apparatus shown in FIG. 1.

In this case, however, the discharge port 4 was clogged with the mixture and hence the filling was impossible.

Then, the sound proof test was made with respect to the internal trim members for automobile manufactured in Example 1–4 and Comparative Example 1–4.

Concerning sound proof performance, a sound pressure level radiated from the dash panel to the inside of the compartment when the internal trim member was mounted to the dash panel of the passenger car and the car was run on a rotting drum at a speed of 90 km/hr was measured by an acoustic intensity method.

In this case, only the sound radiated from the dash panel was measured by insulating sound from the floor of the car through the lamination structure of porous fiber layer and polyvinyl chloride sheet disposed on the floor surface and filling a urethane foam in a space behind the driver's seat.

The apparent density (g/cm$^3$) of the porous layer in each sample of the internal trim members and the measured sound pressure level (dB) are shown in the following Table 1.

TABLE 1

| Sample | Apparent density (g/cm$^3$) | Sound pressure level (dB) |
| --- | --- | --- |
| Example 1 | 0.07 | 45 |
| Example 2 | 0.08 | 43 |
| Example 3 | 0.10 | 42 |
| Example 4 | 0.12 | 40 |
| Comparative Example 1 | 0.18 | 48 |
| Comparative Example 2 | 0.06 (sticking) | 51 |
| Comparative Example 3 | 0.007 | 49 |
| Comparative Example 4 | 0.003 | 49 |

The sound pressure level (dB) in Table 1 is a value obtained by adding energies in a frequency range of 125 Hz–1.6 MHz at characteristic A.

As seen from Table 1, the internal trim members according to the invention (Examples 1–4) are excellent in the effect of reducing noise.

In the above actual car test, the porous layer of the fiber assembly was first manufactured and then the sheet-like mass layer (sound insulating layer) was laminated thereonto. Alternatively, there can be adopted a method wherein the sheet-like mass layer is previously laid inside the mold and then fibers and hot air are blown thereinto to form an internal trim member.

The internal trim members having an excellent sound proofness, a light weight and high size accuracy and productivity were obtained in all of Examples 1–4.

As mentioned above, according to the first embodiment invention, the internal trim member for automobile comprises a fiber assembly made from staples having a fiber size distribution center of not more than 30 denier and shaped at an average apparent density of 0.04–0.15 g/cm$^3$ in accordance with a shape of a vehicle body panel in the automobile, and a sheet-like sound insulating layer laminated thereon and having a surface weight of 1.0–8.0 kg/m$^2$, so that the sound proofness is excellent and the shape of the internal trim member can accurately be matched with the uneven shape of the vehicle body panel. Therefore, when such a member is mounted to the dash panel or floor panel, the noise reduction space in the compartment can be realized.

Further, when the fiber assembly is formed by the filling method wherein the staples are blown in a mold together with air, there is obtained an effect that the density of the porous layer is more stably adjusted to make the density distribution uniform.

And also, when the fiber assembly is shaped and solidified by using a fiber-like binder, the uniformity of the density in the porous layer is excellent.

Moreover, when the fiber assembly is shaped and solidified by using a fiber-like binder and blowing hot air or steam into the mold, the shaping cycle of sound proof porous shaped body can be improved and also the curing is made uniform up to the inside of the shaped body.

In addition, when the fiber assembly is shaped and solidified by mixing with not less than 10% by weight of staple-like asphalt or its analogous material and blowing hot air or steam thereinto, the damping performances can be given to the sound absorptive porous layer to improve acoustic performances.

According to the second invention, the internal trim member for automobile comprises a fiber assembly obtained by preliminary shaping staples having a fiber size distribution center of not more than 30 denier with a binder into a flat plate-like fiber assembly having an apparent density of not more than 0.025 g/cm$^3$ and compression shaping at a compression ratio of 2–4 in accordance with a shape of a vehicle body panel in the automobile, and a sheet-like sound insulating layer laminated thereon and having a surface weight of 1.0–8 kg/m$^2$, so that the density can freely be adjusted to a desirable value and also the size and shape can precisely and closely be matched with the uneven shape of the vehicle body panel.

What is claimed is:

1. An internal trim member for automobile comprising; a fiber assembly made from staples having a fiber size distribution center of not more than 30 denier and mixed with a fibrous binder for shaping and solidifying said fiber assembly and shaped at an average apparent density of 0.04–0.15 g/cm$^3$ in accordance with a shape of a vehicle body panel in the automobile, and a sound insulating sheet layer laminated thereon and having a surface weight of 1.0–8.0 kg/m$^2$.

2. The internal trim member according to claim 1, wherein the fiber assembly is formed by a filling method wherein the staples are blown in a mold together with air.

3. The internal trim member according to claim 1, wherein the shaping and solidifying of the fiber assembly is made by blowing hot air or steam into the mold.

4. The internal trim member according to any ne of claim 1, 2 or 3, wherein the fiber assembly is shaped and solidified by mixing the staples with not less than 10% by weight of staple asphalt.

5. An internal trim member for automobile comprising a fiber assembly obtained by preliminary shaping staples having a fiber size distribution center of not more than 30 denier with a binder into a flat plate fiber assembly having an apparent density of not more than 0.025 g/cm$^3$ and compression shaping at a compression ratio of 2-4 in accordance with a shape of a vehicle body panel in the automobile, and a sheet sound insulating layer laminated thereon and having a surface weight of 1.0–8 kg/m$^2$.

* * * * *